United States Patent
Phillips

(10) Patent No.: US 7,961,375 B2
(45) Date of Patent: Jun. 14, 2011

(54) MULTI-CELL SOLID-STATE ELECTROCHROMIC DEVICE

(75) Inventor: Roger W. Phillips, Santa Rosa, CA (US)

(73) Assignee: Soladigm, Inc., Milpitas, CA (US)

( * ) Notice: Subject to any disclaimer, the term of this patent is extended or adjusted under 35 U.S.C. 154(b) by 73 days.

(21) Appl. No.: 12/145,846

(22) Filed: Jun. 25, 2008

(65) Prior Publication Data

US 2009/0323155 A1    Dec. 31, 2009

(51) Int. Cl.
*G02B 1/15* (2006.01)
(52) U.S. Cl. .......................................... 359/265; 359/270
(58) Field of Classification Search .................. 359/265, 359/245, 270, 290, 296, 297, 275; 257/103
See application file for complete search history.

(56) References Cited

U.S. PATENT DOCUMENTS

| | | |
|---|---|---|
| 3,280,701 A | 10/1966 | Donnelly et al. |
| 3,453,038 A | 7/1969 | Kissa et al. |
| 4,135,790 A * | 1/1979 | Takahashi et al. ............ 359/275 |
| 4,294,518 A | 10/1981 | O'Connor et al. |
| 4,573,768 A | 3/1986 | Polak et al. |
| 4,958,917 A | 9/1990 | Hashimoto et al. |
| 4,983,957 A | 1/1991 | Ishikawa et al. |
| 5,076,673 A | 12/1991 | Lynam et al. |
| 5,189,549 A | 2/1993 | Leventis et al. |
| 5,384,578 A | 1/1995 | Lynam et al. |
| 5,877,888 A | 3/1999 | Coleman |
| 5,903,382 A | 5/1999 | Tench et al. |
| 5,923,456 A | 7/1999 | Tench et al. |
| 6,094,292 A * | 7/2000 | Goldner et al. ............... 359/265 |
| 6,785,036 B1 | 8/2004 | Berneth et al. |
| 7,256,924 B2 | 8/2007 | Guarr et al. |
| 7,372,610 B2 * | 5/2008 | Burdis et al. .................. 359/265 |
| 7,414,771 B2 * | 8/2008 | Martin .......................... 359/265 |

OTHER PUBLICATIONS

C.M. Lambert, Towards large-area photovoltaic nanocells: experiences learned from smart window technology, Solar Energy Materials and Solar Cells, (1994) pp. 307-321.

* cited by examiner

*Primary Examiner* — Timothy J Thompson
(74) *Attorney, Agent, or Firm* — Joseph P. Curtin, L.L.C.

(57) ABSTRACT

A multi-cell electrochromic device comprises a plurality of solid-state electrochromic cells that are arranged in an optical alignment. Each electrochromic cell is separated from an adjacent electrochromic cell in the optical alignment by a transparent conductive layer that is shared by the two adjacent electrochromic cells.

24 Claims, 2 Drawing Sheets

MULTI-CELL SOLID-STATE ELECTROCHROMIC DEVICE

BACKGROUND

The subject matter disclosed herein relates to a multi-cell electrochromic device. More particularly, the subject matter disclosed herein relates to a solid-state multi-cell electrochromic device that provides a lighter weight that conventional multi-cell electrochromic devices, improved independent cell properties, faster switching times, and more uniform coloring in its colored state.

The field of electrochromics is extensive and has been developing over about the last forty years. In one application, an electrochromic coating is used for controlling the amount of light and heat passing through the window based on a user-controlled electrical potential that is applied across the optical stack of the electrochromic coating. Not only can an electrochromic coating reduce the amount of energy used for room heating and/or air conditioning, an electrochromic coating can also be used for providing privacy. By switching between a clear state having an optical transmission of about 60-80% and a darkened state having an optical transmission of between 0.1-10%, both energy flow into a room through a window and privacy provided by the window can be controlled. The amount of glass used for various types of windows, such as skylights, aircraft windows, residential and commercial building windows, and automobile windows, is on the order of one billion square meters per year. Accordingly, the potential energy saving provided by electrochromic glazing is substantial. See, for example, Solar Energy Materials and Solar Cells, (1994) pp. 307-321.

Over the forty years that electrochromics have been developing, various structures for electrochromic devices have been proposed including, solution-phase electrochromic devices, solid-state electrochromic devices, gasochromic devices, and photochromic devices.

For example, a conventional electrochromic cell generally is structured as follows: a substrate, a transparent conductive layer, a counter electrode, an ion transport layer, an electrochromic layer, and a transparent conductive layer. Conventional cathodic materials, commonly referred to as "electrochromic electrodes," have included tungsten oxide $WO_3$ (most common), vanadium oxide $V_2O_5$, niobium oxide $Nb_2O_3$ and iridium oxide $IrO_2$. Anodic materials, commonly referred to as "counter electrodes," include nickel oxide NiO, tungsten-doped nickel oxide, and iridium oxide $IrO_2$. The ion layer materials exhibit a poor electron conductor, but a good ion conductor. Examples of ion layer materials include $SiO_2$, $TiO_2$, $Al_2O_3$, and $Ta_2O_5$.

Various types of transparent conducting thin films have been employed for the first and second transparent conducting layers, such as, indium tin oxide ITO, which is the most commonly used material. Other thin metal layers have also been used, such as fluorine-doped tin oxide, antimony-doped tin oxide, and fluorine-doped aluminum oxide. Regardless which thin film is used, conductivities of less than about 20 Ohms/□ are needed in order to produce a uniform voltage between the two conductive layers across the conductive layers. Even lower conductivities than about 20 Ohms/□ are needed for large panes of glass measuring 3-4 feet across.

If a voltage of between 1-4 Volts is applied between the first and second transparent conducting layers, the following reactions take place. At the anode, the following reaction takes place:

Metal Oxide or Polymer or Organic Molecule (Colored)+$xM^+$+$xe^- \leftrightarrow$ Metal Oxide or Polymer or Organic Molecule (Transparent).

At the cathode, the following reaction takes place:

Metal Oxide or Polymer or Organic Molecule (Transparent)+$xM^+$+$xe^- \leftrightarrow$ Metal Oxide or Polymer or Organic Molecule (Colored).

in which M is $H^+$, $Li^+$ or $Na^+$, e is an electron, and x is an integer.

Conventional single electrochromic cells often exhibit variations in coloring due to non-uniform fields and differential ion migration. This is especially true for large area glazings in which resistances of the conductive coating layers cause voltage drops between the center of the window pane and the bus bars supplying the voltage.

In an effort to mitigate these difficulties, two approaches have been tried. U.S. Pat. No. 7,256,924 B2 to Guarr et al., which is incorporated herein by reference, discloses two electrochromic cells in optical alignment. Each cell is enclosed by substrates on each side so that for two cells, a total of four substrates are required. Each cell is also enclosed with top and bottom sealants and the cell cavity contains at least one solvent or gel-like material. Electrical power to the multi-cells is placed in series or in parallel with the two cells.

U.S. Pat. No. 5,076,673 to Lynam et al. also discloses a multi-cell electrochromic structure. This structure, like the structures disclosed in U.S. Pat. No. 7,256,924 B2 to Guarr et al., also has each individual cell encased with two substrates (in this case, glass) and top and bottom sealants. The cells are configured to alternatively color and bleach with an applied electrical potential. In the disclosed Lynam et al. structure, three substrates are required for two cells, and within the cells at least one liquid, gel or semi-solid electrochromic is used.

U.S. Pat. No. 4,135,790 to Takahashi et al. discloses a composite electrochromic cell that uses one colorant per pair of transparent electrodes.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The word "exemplary" is used herein to mean "serving as an example, instance, or illustration." Any embodiment described herein as "exemplary" is not to be construed as necessarily preferred or advantageous over other embodiments.

The subject matter disclosed herein relates to a multi-cell all-solid-state electrochromic device that provides a lightweight structure, is non-leaking because it is formed from solid-state materials, and includes the ability for each individual cell to be powered independently from other cells of the multi-cell device. Additionally, two coloring layers are used per pair of transparent electrodes, which decreases the number of layers required for a given colorant level. A counter electrode, such as NiOH, which colors upon loss of the insertion ions ($H^+$, $Li^+$ or Na+), is used between the transparent conductive layer and the electron blocking layer (that is, the ion layer, which transmits ions, but blocks electrons). The cathodic layer, such as $WO_3$, colors when insertion ions ($H^+$, $Li^+$ or Na+) are added. Both reactions occur simultaneously. Ions such as $H^+$, $Li^+$ or Na+ can move through the ion conductor layer and could be present as the ion conductor layer is formed, for example, the ion conductor layer and $Li^+$ are co-sputtered when the ion conductor layer is formed. In a way, co-sputtering preloads the ion conductor layer with the transportation and makes that layer perhaps more mobile to the Li+ ions.

According to the subject matter disclosed herein, each cell of the multi-cell device is vacuum deposited in a continuous fashion onto a substrate. Any deposition method may be used, i.e., electron beam, AC sputtering, DC sputtering or CVD for deposition of the various layers. When mounted in a window glazing, only two substrates are required. Moreover, the subject matter disclosed herein minimizes color variation across the multi-cell device compared to a single cell of an equivalent thickness (i.e., a better color uniformity because variations in color will tend to cancel), provides faster switching times than a conventional multi-cell device if the electrochromic (EC) and counter electrode (CE) layers are thinner than the EC and CE layers of a conventional electrochromic device, and provides an increased privacy factor (i.e., an overall lower transmission).

In one exemplary embodiment of the subject matter disclosed herein, the electrochromic structure is a symmetrical structure comprising a central transparent conductive layer that acts as a common electrode adjoining adjacent cells. One exemplary embodiment comprises a common transparent conducting layer sandwiched between two electrochromic layers (cathodes). In yet another exemplary embodiment, the transparent conducting layer is formed between two counter electrodes (anodes).

Figure 1:
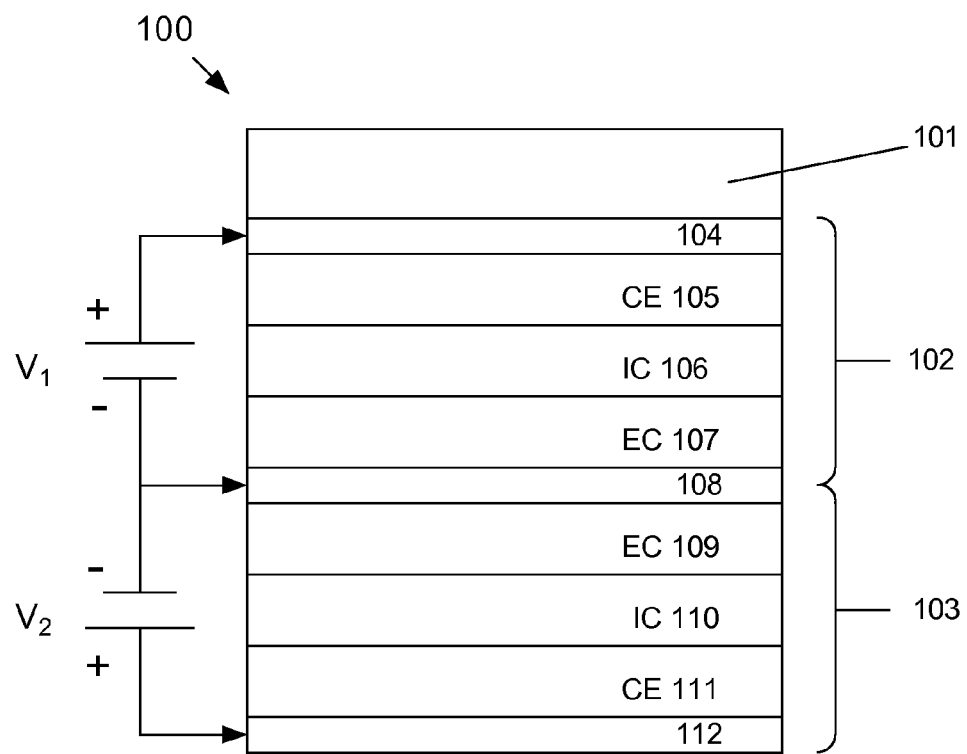
FIG. 1 depicts a sectional view of a first exemplary embodiment of a solid-state electrochromic device according to the subject matter disclosed herein.

FIG. 1 depicts a sectional view of a first exemplary embodiment of a solid-state electrochromic device 100 according to the subject matter disclosed herein. Electrochromic device 100 comprises a glass layer 101 and two solid-state electrochromic cells 102 and 103 in series. Electrochromic cell 102 comprises a transparent conductive layer 104, a counter electrode (CE) layer 105 (anode), an ion conductor (IC) layer 106, an electrochromic (EC) layer 107 (cathode), and a transparent conductive layer 108. Electrochromic cell 103 comprises transparent conductive layer 108, an electrochromic (EC) layer 109 (cathode), an ion conductor (IC) layer 110, a counter electrode (CE) layer 111 (anode), and a transparent conductive layer 112.

Electrochromic cells 102 and 103 share transparent conductive layer 108. Voltages $V_1$ and $V_2$ are respectively applied between conductive layer 104 and conductive layer 108, and conductive layer 108 and conductive layer 112. Voltages $V_1$ and $V_2$ can be independently applied across electrochromic cells 102 and 103.

Figure 2:
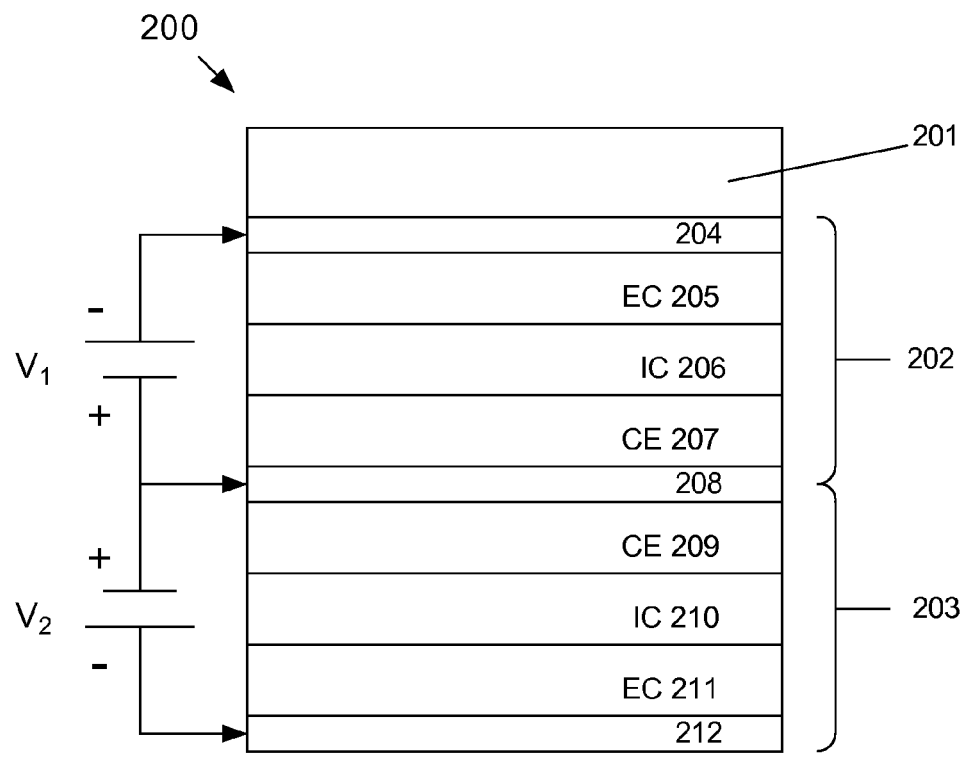
FIG. 2 depicts a sectional view of a second exemplary embodiment of a solid-state electrochromic device according to the subject matter disclosed herein.

FIG. 2 depicts a sectional view of a second exemplary embodiment of a solid-state electrochromic device 200 according to the subject matter disclosed herein. Electrochromic solid-state device 200 comprises a glass layer 201 and two solid-state electrochromic cells 202 and 203 in series. Electrochromic cell 202 comprises a transparent conductive layer 204, an electrochromic (EC) layer 205 (cathode), an ion conductor (IC) layer 206, a counter electrode (CE) layer 207 (anode), and a transparent conductive layer 208. Electrochromic cell 203 comprises transparent conductive layer 208, a counter electrode (CE) layer 209 (anode), an ion conductor (IC) layer 210, an electrochromic (EC) layer 211 (cathode), and a transparent conductive layer 212.

Electrochromic cells 202 and 203 share transparent conductive layer 208. Voltages $V_1$ and $V_2$ are respectively applied between conductive layer 204 and conductive layer 208, and conductive layer 208 and conductive layer 212. Voltages $V_1$ and $V_2$ can be independently applied across electrochromic cells 202 and 203.

Figure 3:
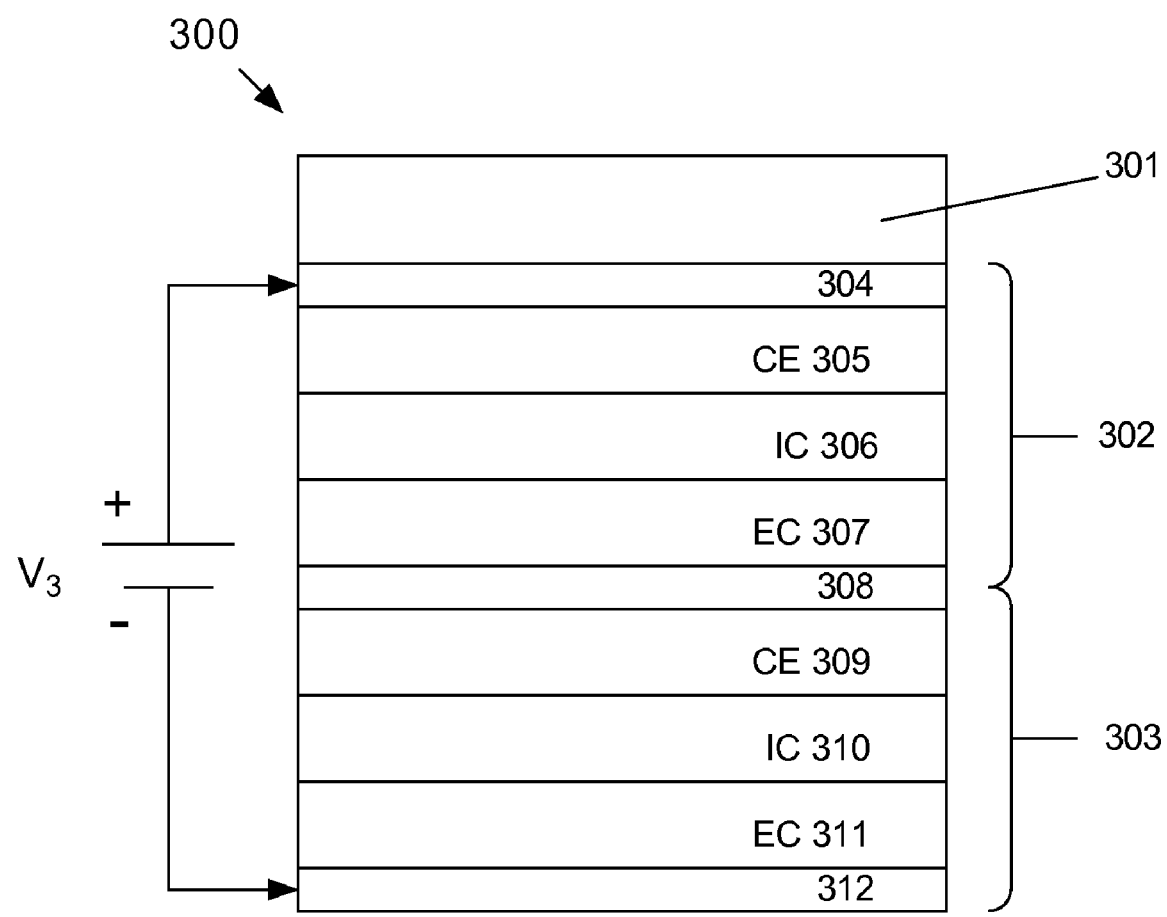
FIG. 3 depicts a sectional view of a third exemplary embodiment of a solid-state electrochromic device according to the subject matter disclosed herein.

FIG. 3 depicts a sectional view of a third exemplary embodiment of a solid-state electrochromic device 300 according to the subject matter disclosed herein. Electrochromic solid-state device 300 comprises a glass layer 301 and two solid-state electrochromic cells 302 and 303 in series. Electrochromic cell 302 comprises a transparent conductive layer 304, a counter electrode (CE) layer 305 (anode), an ion conductor (IC) layer 306, an electrochromic (EC) layer 307 (cathode), and a transparent conductive layer 308. Electrochromic cell 303 comprises transparent conductive layer 308, a counter electrode (CE) layer 309 (anode), an ion conductor (IC) layer 310, an electrochromic (EC) layer 311 (cathode), and a transparent conductive layer 312. Electrochromic cells 302 and 303 share transparent conductive layer 308.

For electrochromic solid-state device 300, center transparent conductive layer 308 does not need an external electrical connection and it can be very thin, e.g., between 10-100 nm of indium tin oxide ITO. For the third exemplary embodiment, a primary function of transparent conductive layer 308 is to block ions and to conduct electrons across the two cells.

It should be understood that shared transparent conductive layer 308 should have the capability to block the appropriate ions when the appropriate voltages are applied across the solid-state electrochromic device 300. (The applied voltages may need to be about twice the applied voltages for a single cell, such as a single cell of the exemplary embodiments shown in FIGS. 1 and 2. It should be understood that shared transparent conductive layer 308 should not degrade in the appropriate applied voltages.) In most cases, indium tin oxide ITO will be suitable for shared transparent layer 308. It is possible, however, that if the applied voltages are too large, the shared ITO may be reduced by the ions. In such a situation, the indium tin oxide ITO could be sandwiched in two additional thin ion blocking layers, such as TiN, C, etc., and the additional thin ion blocking layers should provide acceptable electron conductivity. Alternatively, the indium tin oxide ITO could be replaced altogether with a thin layer composed of an ion blocking material that is suitable for the applied voltages.

It should be understood that the order of layers described for the third exemplary embodiment depicted in FIG. 3 could be arranged in an alternative exemplary configuration in which the electrochromic cell corresponding to cell 302 comprises a transparent conductive layer, an electrochromic (EC) layer (cathode), an ion conductor (IC) layer, a counter electrode (CE) layer (anode), and a shared transparent conductive layer, and the electrochromic cell corresponding to cell 303 comprises the shared transparent conductive layer, an electrochromic (EC) layer (cathode), an ion conductor (IC) layer, a counter electrode (CE) layer (anode) and a transparent conductive layer.

The thickness of the electrochromic (EC) layers for the exemplary embodiments depicted in FIGS. 1-3 is typically half of what would be found in a conventional electrochromic cell, that is, the thickness of the electrochromic layers would in the range of about 100-600 nm with about 400 nm being a nominal thickness when $WO_3$ is used. For the counter electrode (CE) layer, the thickness would be in the range of about 100-600 nm with about 200 nm being a nominal thickness when NiO is used. The ion conducting layer, formed from, for example, SiO$_2$, would have a thickness in the range of about 10-150 nm with a nominal thickness of about 50 nm. Additionally, a mobile ion of hydrogen, lithium or sodium is added to one of more of the layers in the three embodiments. In particular, lithium may be co-sputtered with the oxide ion layer, the EC layer or the CE layer and/or sputtered as sequential layers before, during and after the ion, CE and/or EC layers. During deposition, the elemental lithium is converted to lithium ions from reaction with the residual molecules of water in the oxide or from within the chamber atmosphere. Lithium is added, for example, with SiO$_2$ in a Li/Si ratio of 0.5 to 4.

According to the subject matter disclosed herein, all three exemplary embodiments disclosed above can each have more than two cells, thereby providing a further increase in the switching speed, lower overall optical transmission and more uniform coloration. That is, the subject matter disclosed herein can be extended to multi-cell solid-state electrochromic devices having any number of a plurality of solid-state electrochromic cells. Further, it should be understood that the glass layer, depicted at the "top" of the optical stack in each of FIGS. 1-3, could be positioned at the "bottom" of the optical stack.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A multi-cell electrochromic device, comprising:
   a plurality of solid-state electrochromic cells arranged in an optical alignment, each electrochromic cell being separated from an adjacent electrochromic cell in the optical alignment by a transparent conductive layer that is shared by the two adjacent electrochromic cells,
   a first electrochromic cell of the plurality of solid-state electrochromic cells comprising:
      a first transparent conductive layer;
      a counter electrode layer formed in contact with the first transparent conductive layer;
      an ion conductor layer formed in contact with the counter electrode layer;
      an electrochromic layer formed in contact with the ion conductor layer; and
      the shared transparent conductive layer formed in contact with the electrochromic layer; and
   a second electrochromic cell of the plurality of solid-state electrochromic cells comprising:
      an electrochromic layer formed in direct contact with the shared transparent conductive layer;
      an ion conductor layer formed in contact with the electrochromic layer;
      a counter electrode layer formed in contact with the ion conductor layer; and
      a second transparent conductive layer formed in direct contact with counter electrode layer,
   each electrochromic layer comprises tungsten oxide WO$_3$, vanadium oxide V$_2$O$_5$, niobium oxide Nb$_2$O$_3$ or iridium oxide IrO$_2$,
   each counter electrode layer comprises nickel oxide NiO, tungsten-doped nickel oxide, or iridium oxide IrO$_2$,
   each ion conductor layer comprises silicon oxide SiO$_2$, titanium oxide TiO$_2$, aluminum oxide Al$_2$O$_3$, or tantalum oxide Ta$_2$O$_5$, and
   a first voltage being applied between the first transparent conductive layer and the shared transparent conductive layer, and a second voltage being applied between the shared transparent conductive layer and the second transparent conductive layer, the first and second voltages being different from each other.

2. The multi-cell electrochromic device according to claim 1, wherein both the electrochromic layer and the counter electrode become colored when a negative voltage is applied between the first transparent layer and the shared transparent layer.

3. The multi-cell electrochromic device according to claim 1, wherein both the electrochromic layer and the counter electrode become colorless when a positive voltage is applied between the first transparent layer and the shared transparent layer.

4. The multi-cell electrochromic device according to claim 1, wherein at least one of the electrochromic layer, the ion conductor layer, or the counter electrode layer further comprises insertion ions comprising H+, Li+ or Na+.

5. The multi-cell electrochromic device according to claim 1, further comprising a substrate, and
   wherein the first transparent conductive layer is formed in contact with the substrate.

6. The multi-cell electrochromic device according to claim 1, wherein the shared transparent conductive layer comprises at least one ion blocking layers.

7. A multi-cell electrochromic device, comprising:
   a plurality of solid-state electrochromic cells arranged in an optical alignment, each electrochromic cell being separated from an adjacent electrochromic cell in the optical alignment by a transparent conductive layer that is shared by the two adjacent electrochromic cells,
   a first electrochromic cell of the plurality of solid-state electrochromic cells comprising:
      a first transparent conductive layer;
      a counter electrode layer formed in contact with the first transparent conductive layer;
      an ion conductor layer formed in contact with the counter electrode layer;
      an electrochromic layer formed in contact with the ion conductor layer; and
      the shared transparent conductive layer formed in contact with the electrochromic layer; and
   a second electrochromic cell of the plurality of solid-state electrochromic cells comprising:
      an electrochromic layer formed in direct contact with the shared transparent conductive layer;
      an ion conductor layer formed in contact with the electrochromic layer;
      a counter electrode layer formed in contact with the ion conductor layer; and
      a second transparent conductive layer formed in direct contact with counter electrode layer,
   each electrochromic layer comprises tungsten oxide WO$_3$, vanadium oxide V$_2$O$_5$, niobium oxide Nb$_2$O$_3$ or iridium oxide IrO$_2$,
   each counter electrode layer comprises nickel oxide NiO, tungsten-doped nickel oxide, or iridium oxide IrO$_2$,
   each ion conductor layer comprises silicon oxide SiO$_2$, titanium oxide TiO$_2$, aluminum oxide Al$_2$O$_3$, or tantalum oxide Ta$_2$O$_5$, and a voltage being applied between the first transparent conductive layer and the second transparent conductive layer, and no voltage being applied to the shared conductive layer.

8. The multi-cell electrochromic device according to claim 7, wherein at least one of the electrochromic layer, the ion conductor layer, or the counter electrode layer further comprises insertion ions comprising H+, Li+ or Na+.

9. The multi-cell electrochromic device according to claim 7, wherein the shared transparent conductive layer comprises at least one ion blocking layers.

10. The multi-cell electrochromic device according to claim 7, wherein both the electrochromic layer and the counter electrode become colored when a negative voltage is applied between the first transparent layer and the shared transparent layer.

11. The multi-cell electrochromic device according to claim 7, wherein both the electrochromic layer and the counter electrode become colorless when a positive voltage is applied between the first transparent layer and the shared transparent layer.

12. The multi-cell electrochromic device according to claim 7, further comprising a substrate, and
wherein the first transparent conductive layer is formed in contact with the substrate.

13. A multi-cell electrochromic device, comprising:
a plurality of solid-state electrochromic cells arranged in an optical alignment, each electrochromic cell being separated from an adjacent electrochromic cell in the optical alignment by a transparent conductive layer that is shared by the two adjacent electrochromic cells,
a first electrochromic cell comprises:
a first transparent conductive layer;
an electrochromic layer formed in contact with the first transparent conductive layer;
an ion conductor layer formed in contact with the electrochromic layer;
a counter electrode layer formed in contact with the ion conductor layer; and
the shared transparent conductive layer formed in contact with the counter electrode layer; and
a second electrochromic cell comprising:
a counter electrode layer formed in direct contact with the shared transparent conductive layer;
an ion conductor layer formed in contact with the counter electrode layer;
an electrochromic layer formed in contact with the ion conductor layer; and
a second transparent conductive layer formed in direct contact with electrochromic layer,
each electrochromic layer comprises tungsten oxide $WO_3$, vanadium oxide $V_2O_5$, niobium oxide $Nb_2O_3$ or iridium oxide $IrO_2$,
each counter electrode layer comprises nickel oxide NiO, tungsten-doped nickel oxide, or iridium oxide $IrO_2$,
each ion conductor layer comprises silicon oxide $SiO_2$, titanium oxide $TiO_2$, aluminum oxide $Al_2O_3$, or tantalum oxide $Ta_2O_5$, and
a first voltage being applied between the first transparent conductive layer and the shared transparent conductive layer, and a second voltage being applied between the shared transparent conductive layer and the second transparent conductive layer, the first and second voltages being different from each other.

14. The multi-cell electrochromic device according to claim 13, wherein at least one of the electrochromic layer, the ion conductor layer, or the counter electrode layer further comprises insertion ions comprising H+, Li+ or Na+.

15. The multi-cell electrochromic device according to claim 13, wherein the shared transparent conductive layer comprises at least one ion blocking layers.

16. The multi-cell electrochromic device according to claim 13, wherein both the electrochromic layer and the counter electrode become colored when a negative voltage is applied between the first transparent layer and the shared transparent layer.

17. The multi-cell electrochromic device according to claim 13, wherein both the electrochromic layer and the counter electrode become colorless when a positive voltage is applied between the first transparent layer and the shared transparent layer.

18. The multi-cell electrochromic device according to claim 13, further comprising a substrate, and
wherein the first transparent conductive layer is formed in contact with the substrate.

19. A multi-cell electrochromic device, comprising:
a plurality of solid-state electrochromic cells arranged in an optical alignment, each electrochromic cell being separated from an adjacent electrochromic cell in the optical alignment by a transparent conductive layer that is shared by the two adjacent electrochromic cells,
a first electrochromic cell comprises:
a first transparent conductive layer;
an electrochromic layer formed in contact with the first transparent conductive layer;
an ion conductor layer formed in contact with the electrochromic layer;
a counter electrode layer formed in contact with the ion conductor layer; and
the shared transparent conductive layer formed in contact with the counter electrode layer; and
a second electrochromic cell comprising:
a counter electrode layer formed in direct contact with the shared transparent conductive layer;
an ion conductor layer formed in contact with the counter electrode layer;
an electrochromic layer formed in contact with the ion conductor layer; and
a second transparent conductive layer formed in direct contact with electrochromic layer,
each electrochromic layer comprises tungsten oxide $WO_3$, vanadium oxide $V_2O_5$, niobium oxide $Nb_2O_3$ or iridium oxide $IrO_2$,
each counter electrode layer comprises nickel oxide NiO, tungsten-doped nickel oxide, or iridium oxide $IrO_2$,
each ion conductor layer comprises silicon oxide $SiO_2$, titanium oxide $TiO_2$, aluminum oxide $Al_2O_3$, or tantalum oxide $Ta_2O_5$, and
a voltage being applied between the first transparent conductive layer and the second transparent conductive layer, and no voltage being applied to the shared conductive layer.

20. The multi-cell electrochromic device according to claim 19, wherein the shared transparent conductive layer comprises at least one ion blocking layers.

21. The multi-cell electrochromic device according to claim 19, wherein both the electrochromic layer and the counter electrode become colored when a negative voltage is applied between the first transparent layer and the shared transparent layer.

22. The multi-cell electrochromic device according to claim 19, wherein both the electrochromic layer and the counter electrode become colorless when a positive voltage is applied between the first transparent layer and the shared transparent layer.

23. The multi-cell electrochromic device according to claim 19, further comprising a substrate, and
wherein the first transparent conductive layer is formed in contact with the substrate.

24. The multi-cell electrochromic device according to claim 19, wherein at least one of the electrochromic layer, the ion conductor layer, or the counter electrode layer further comprises insertion ions comprising H+, Li+ or Na+.

* * * * *